(No Model.)
E. LAWSON.
PIPE COUPLING.
No. 438,752. Patented Oct. 21, 1890.
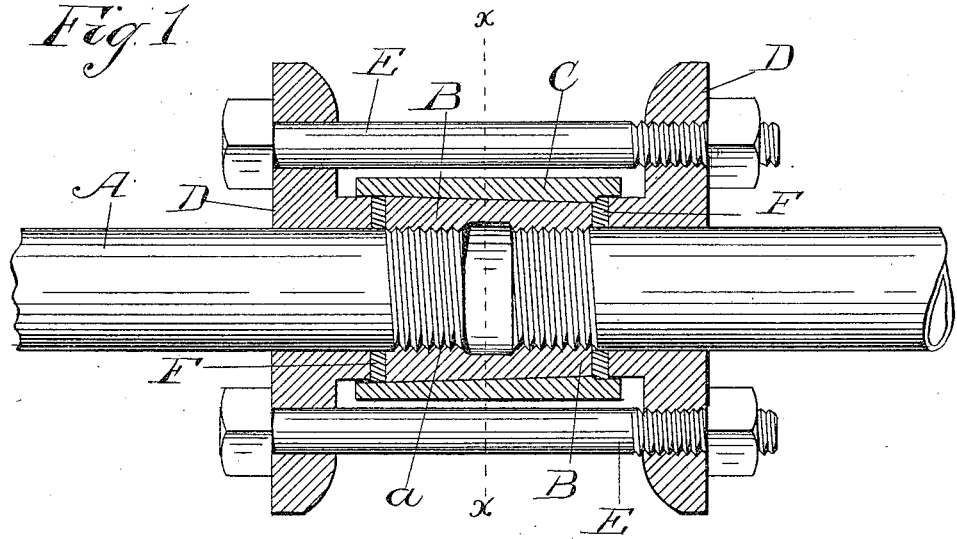
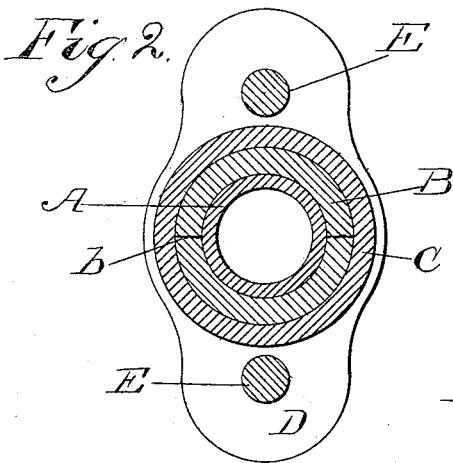
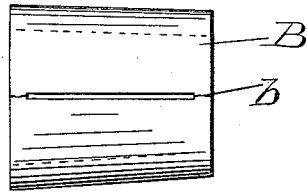
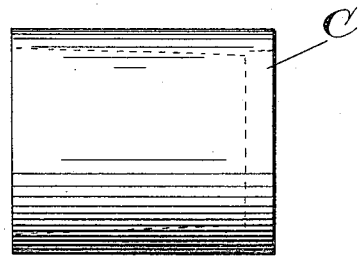
Attest:
John H. Godbold
Marcus S. Levé
Inventor:
Enoch Lawson
By John H. Redstone
Atty in Fact

UNITED STATES PATENT OFFICE.

ENOCH LAWSON, OF SAN FRANCISCO, CALIFORNIA, ASSIGNOR OF ONE-HALF TO PHILLIP LEPROHON, OF SAME PLACE.

PIPE-COUPLING.

SPECIFICATION forming part of Letters Patent No. 438,752, dated October 21, 1890.

Application filed July 13, 1889. Serial No. 317,460. (No model.)

*To all whom it may concern:*

Be it known that I, ENOCH LAWSON, a citizen of the United States, residing in the city and county of San Francisco, and State of California, have invented a new and useful Pipe-Coupling, of which the following is a specification, reference being had to the accompanying drawings, and the letters referring thereto.

My invention relates to metal pipe-couplings in which a joint is effected by means of a divided screw-connecting union, an outer tapering tightening sleeve or cylinder controlled and adjusted by means of two flanges connected by bolts, as will be fully explained in the accompanying drawings.

Figure 1 is a sectional view showing the general arrangement of the whole; Fig. 2, a section cut through the line x; Fig. 3, an elevation of the divided screw-connecting union; Fig. 4, an elevation of the outer connecting and tightening sleeve.

A represents the conducting-pipe; B, the divided screw-connecting sleeve; C, the outer connecting and tightening sleeve; D, the flanges for locking the whole together; E, the connecting-bolts; F, the rubber or other suitable packing-ring. b represents the opening slot for the divided connecting-sleeve.

The following is the construction of my improved coupling: I construct the divided connecting-union B of soft metal, with the opening or slot b about one-eighth of an inch in breadth and extending to within about one-eighth of an inch of the ends of the coupling-union. I cast or form it over a screw or otherwise form it to exactly fit the screw. I then break the union apart by driving a wedge or chisel through the slot b, so that when placed together it will form a perfectly-tight joint at each end of the union and prevent the soft packing from being forced in when the locking-flanges D are being tightened upon the same. I form the outer connecting and tightening sleeve C of steel or malleable iron and taper it upon its interior to correspond to the taper of the outer surface of the divided connecting-coupling B, which is beveled or tapered for the purpose of tightening. I generally form the packing-rings F of rubber and place them in as shown in Fig. 1. I form a recess in the tightening-sleeve C at one end to receive the bearing of the flange D, as shown, against the packing-ring.

The following is the operation of my improved coupling: I bring the ends of the pipe A as near together as will leave space to barely allow the outer connecting and tightening sleeve C to be passed through and put upon the pipe A. I then place the divided screw-connecting sleeve B upon the screw of each of the ends of the pipe A, adjusting it exactly to the threads of the pipe. I then shove the sleeve C upon the sleeve B upon the smaller end and force it on until it is nearly to its place. I then bring up the flanges D and tighten them by means of the bolts E, causing the outer sleeve C to be driven on and the inner sleeve B tightened, and the packing F thoroughly pressed in and perfectly sealing the whole, so that no gas can escape.

Having thus described my invention, what I claim, and desire to secure by Letters Patent, is—

1. In a pipe-coupling, substantially as described, the combination of the interior sleeve or union tapered upon its exterior and interiorly threaded to engage the threads of the pipe-sections, the interiorly-tapered outer sleeve adapted to be placed upon the sleeve B, the packing-rings placed upon the pipes within the outer sleeve and against the ends of the inner sleeve, the flanges or disks also placed upon the sections of pipe and bearing against the packing-rings and ends of the inner sleeve, and bolts connecting said flanges and adapted to draw them together, substantially as described, for the purposes set forth.

2. In a pipe-coupling, the combination, with two sections of pipe, of the sleeve or union interiorly threaded to engage the threaded ends thereof and tapered upon its exterior, the interiorly-tapered outer sleeve adapted to be placed upon the inner union, the packing-rings interposed within the outer sleeve and bearing against the ends of the interior sleeve, and means for exerting a pressure upon the ends of the sleeve, for the purpose set forth, substantially as described.

ENOCH LAWSON.

Witnesses:
JOHN H. REDSTONE,
MARCUS S. LEVI.